Oct. 15, 1957

A. J. JONES ET AL 2,809,471

SPIDER GRINDER

Filed June 6, 1956

INVENTOR
ALVIN J. JONES
CHARLES E. TOLBERT
BY RICHARD C. SHUMAN
ATTORNEY

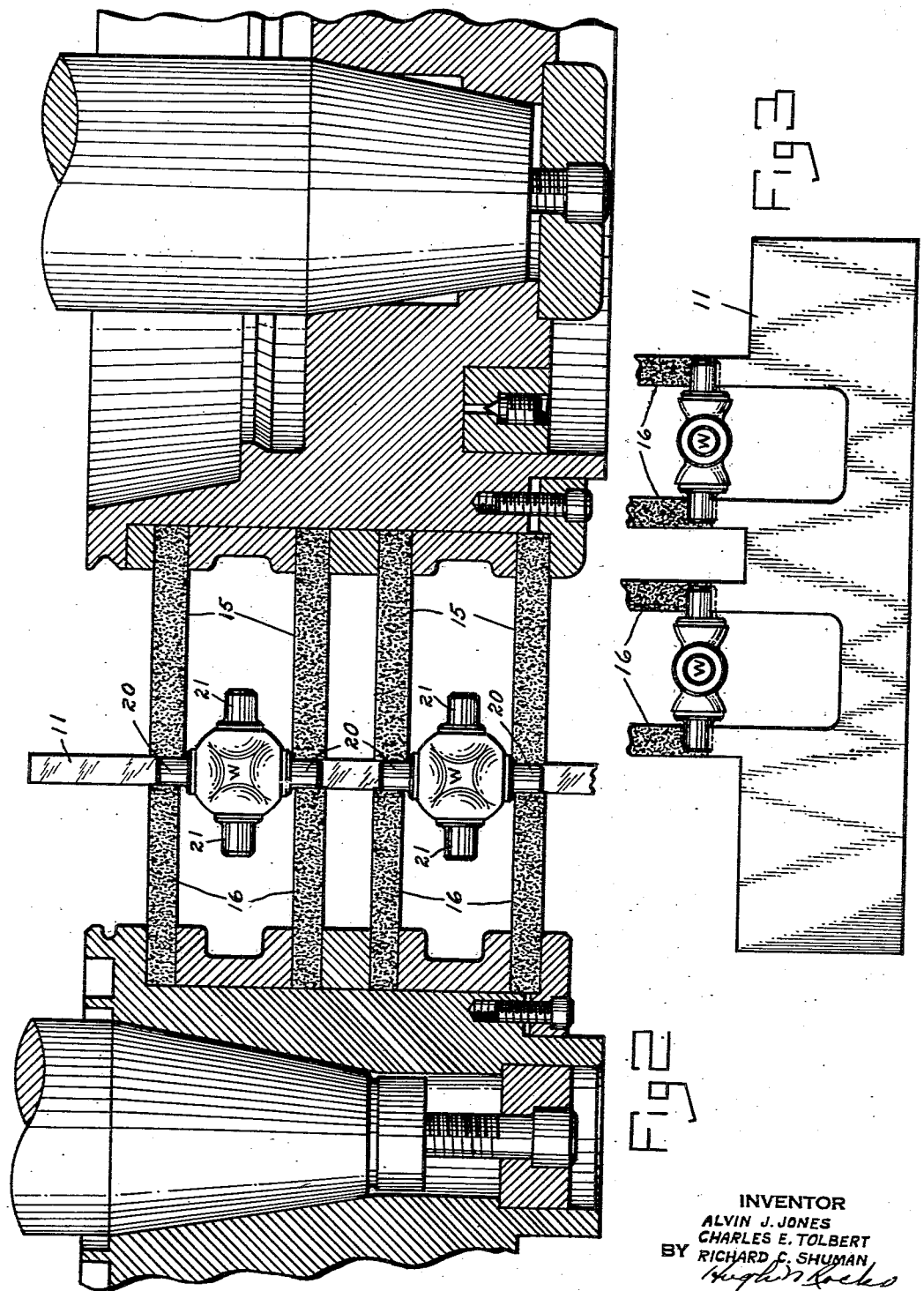

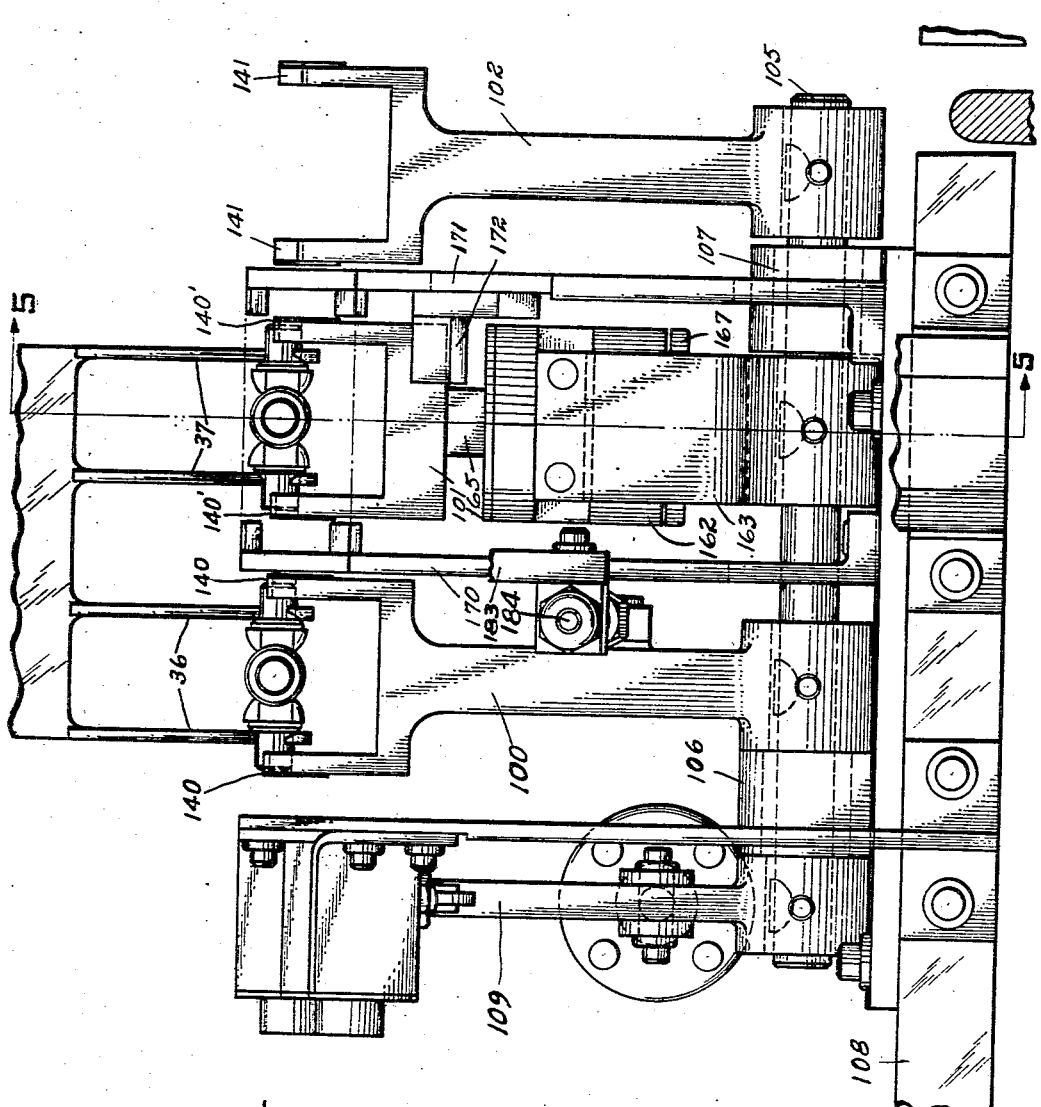

Oct. 15, 1957
A. J. JONES ET AL
2,809,471
SPIDER GRINDER
Filed June 6, 1956
7 Sheets-Sheet 4
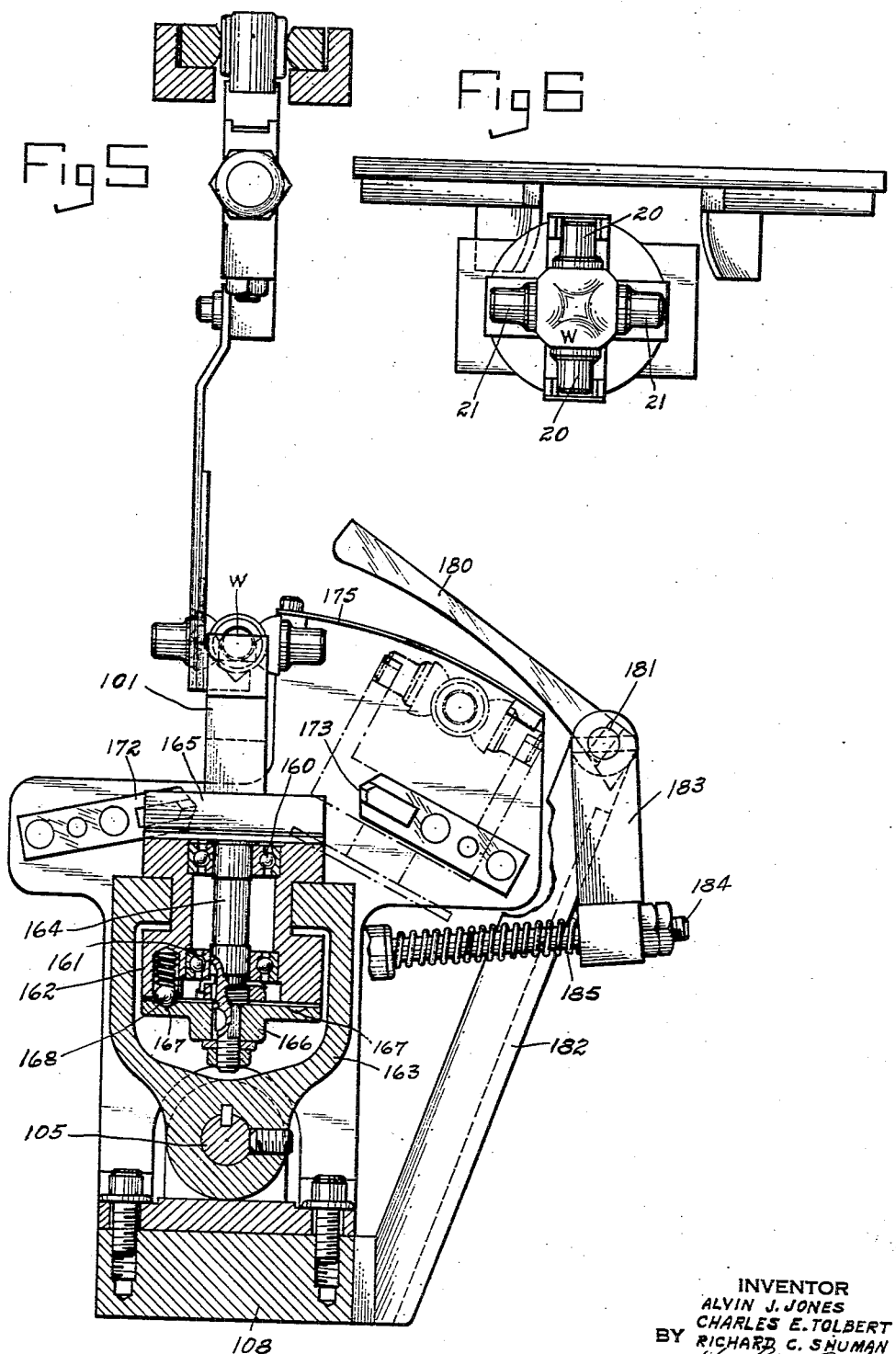
INVENTOR
ALVIN J. JONES
CHARLES E. TOLBERT
BY RICHARD C. SHUMAN
ATTORNEY Oct. 15, 1957     A. J. JONES ET AL     2,809,471
SPIDER GRINDER
Filed June 6, 1956     7 Sheets-Sheet 5
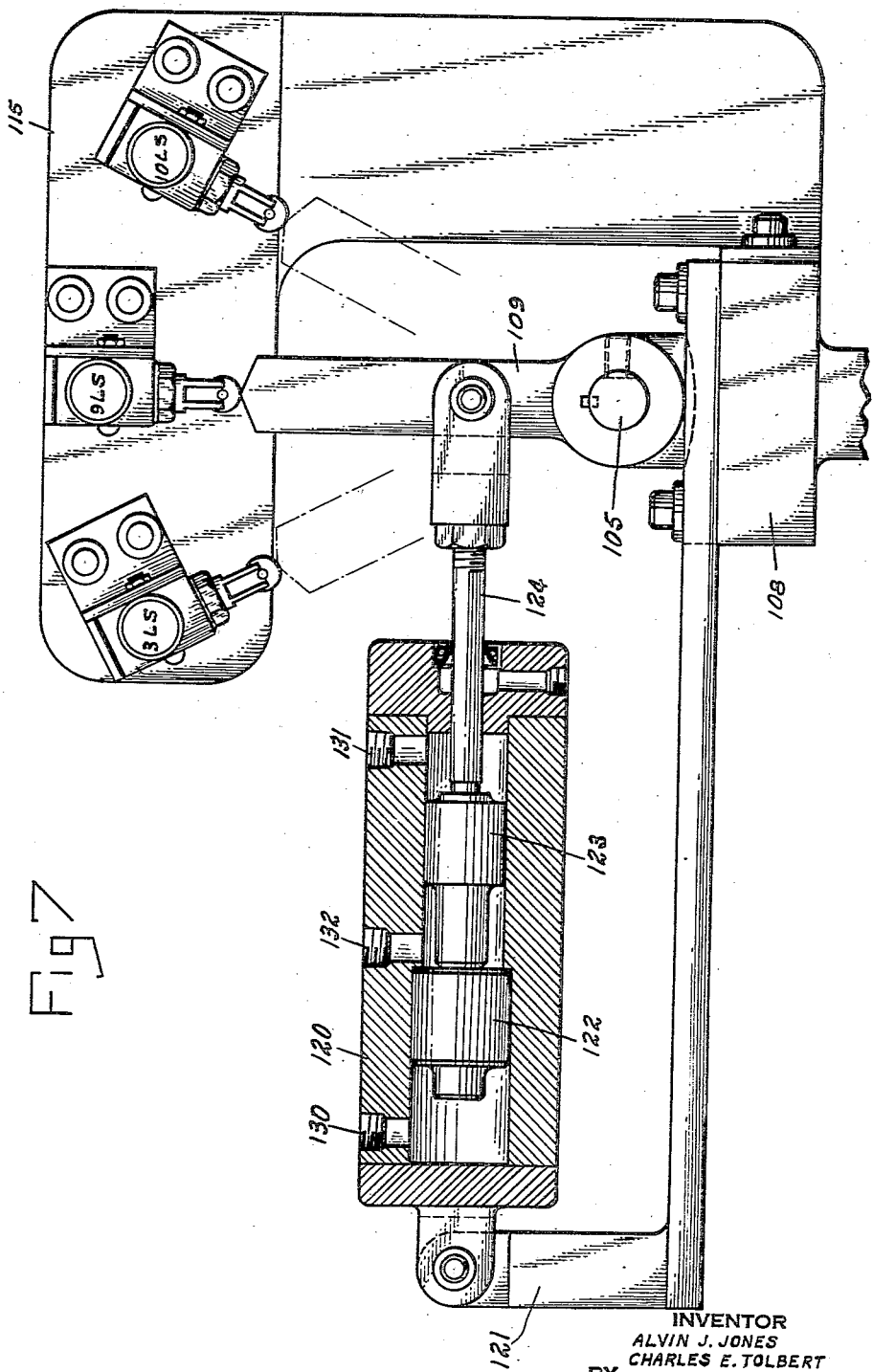
INVENTOR
ALVIN J. JONES
CHARLES E. TOLBERT
BY RICHARD C. SHUMAN
ATTORNEY

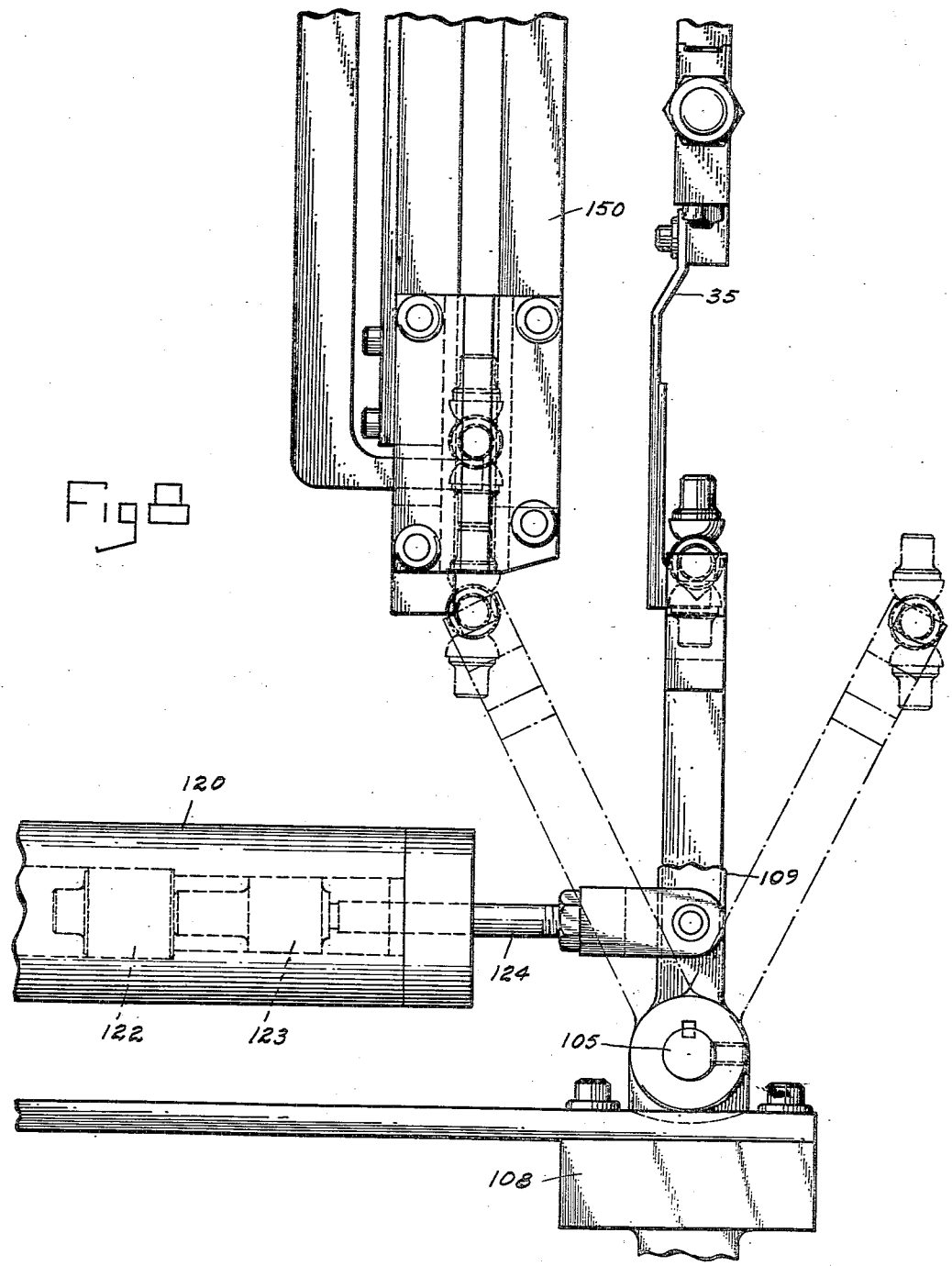

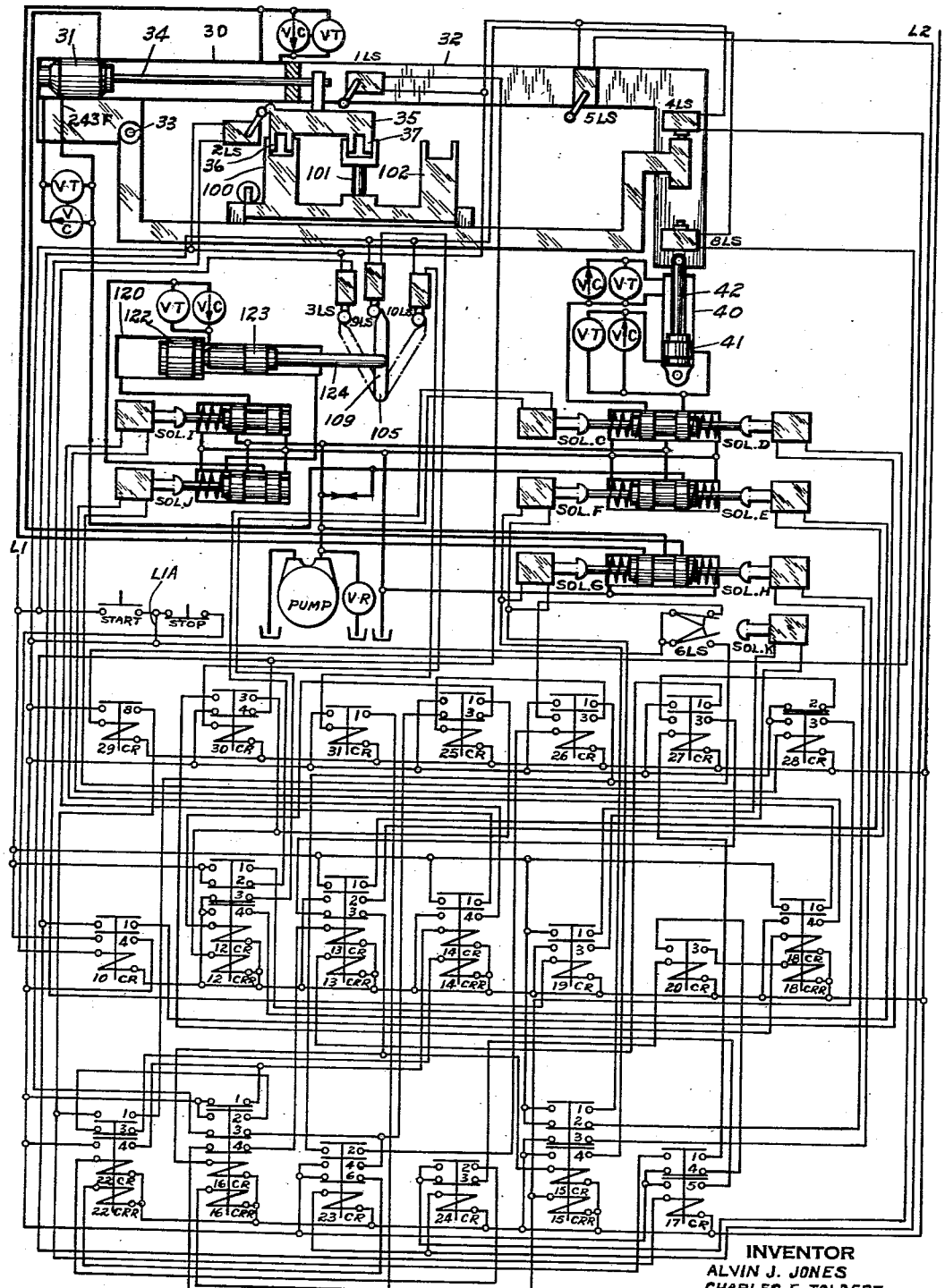

United States Patent Office 2,809,471
Patented Oct. 15, 1957

2,809,471
SPIDER GRINDER

Alvin J. Jones, Charles E. Tolbert, and Richard C. Shuman, Waynesboro, Pa., assignors to Landis Tool Company, Waynesboro, Pa.

Application June 6, 1956, Serial No. 589,651

9 Claims. (Cl. 51—103)

This invention relates to loading devices for use in a centerless grinder particularly for grinding the journal portions of universal joint spiders.

The universal joint spider consists of two sets of axially spaced journal portions on two perpendicular axes. Only two journals on the same axis may be ground at one time so that the workpiece must be indexed in order to position the second set of journals for grinding.

It is therefore an object of this invention to provide a work loading apparatus for placing a workpiece in the machine in a predetermined position to grind axially spaced portions thereof, and thereafter, indexing the workpiece to grind other axially spaced portions at right angles to said first axially spaced portions.

Another object is to provide a device having means for ejecting a finished workpiece, means for indexing a partly finished workpiece, and means for receiving an unground workpiece from a magazine and a common driving device for all three of said means.

A further object is to transfer workpieces endwise to a point above the grinding throat and then laterally into the grinding throat.

A further object is to provide control means to actuate the elements of the loading and the indexing apparatus in predetermined timed relation with the grinding operation.

A further object is to provide means for inserting and removing workpieces in a centerless grinder and for depositing workpieces in proper position in said loading and indexing device.

Figure 2 is a partial plan view in section showing the relation between the workpieces and the grinding and control wheels.

Figure 3 is a partial end elevation showing the relation between the work, work rest, and control wheels.

Figure 4 is an end elevation of the loading and unloading turning mechanism.

Figure 5 is a front elevation of the work carrier and the turning device partly in section.

Figure 6 is a partial plan view of the turning device.

Figure 7 is a front elevation showing the means for actuating the work manipulating device partly in section as well as the limit switches which are operable in each position of said device.

Figure 8 is a front elevation of the work manipulating device showing the relation to the chute which supplies unground workpieces to the machine.

Figure 9 is a hydraulic and electric diagram.

Figure 1:
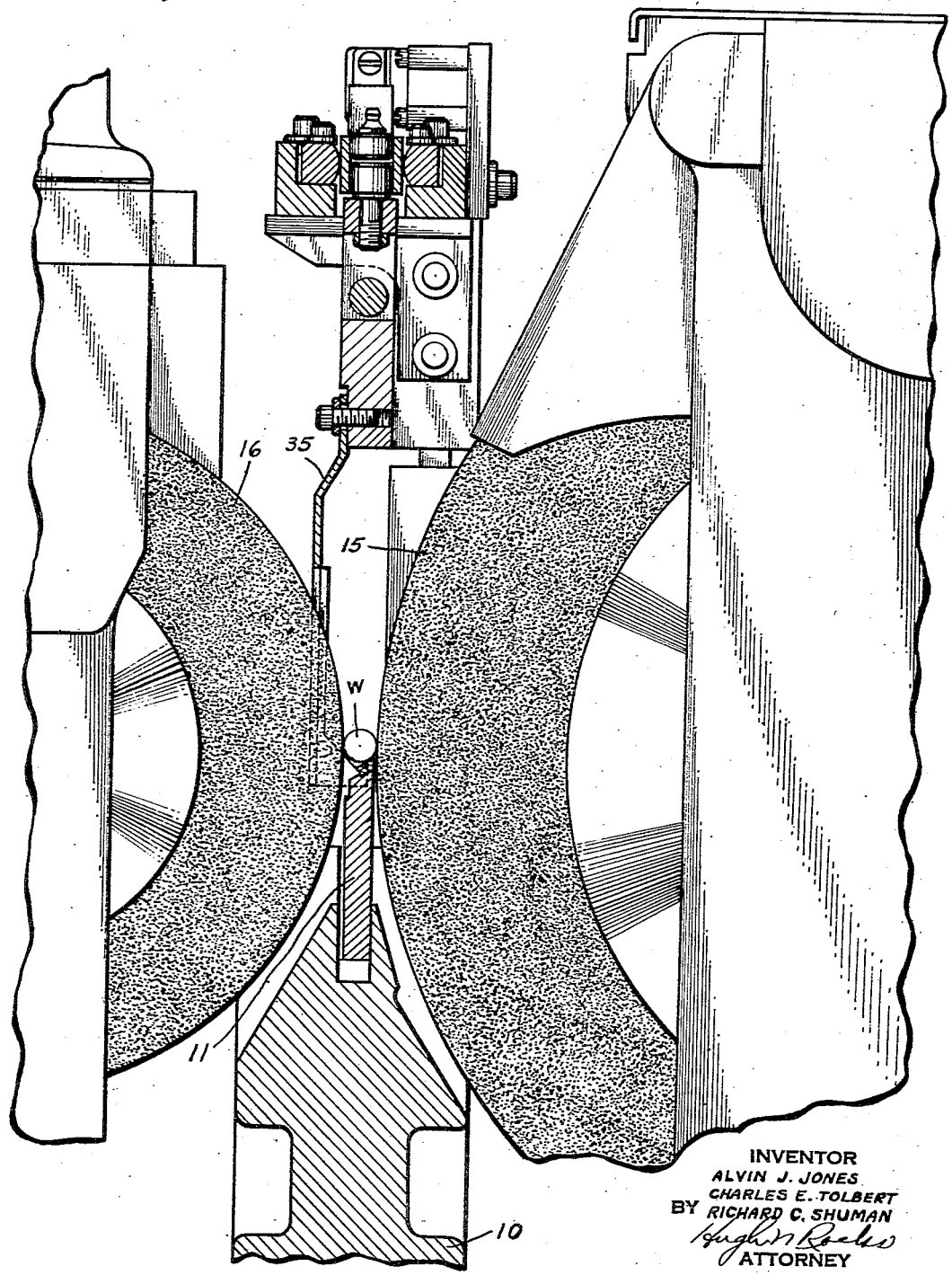
Figure 1 is a partial end elevation of a centerless grinder showing the work carrier partly in section.

In Figure 1 is shown the elements of a conventional centerless grinder including a work rest 10 mounted on a bed (not shown) and having removably mounted therein a work rest blade 11 which extends upwardly between the grinding wheels 15 and control wheels 16 to form a grinding throat in which is mounted a workpiece W.

The grinding throat is formed by four axially spaced grinding wheels 15 with corresponding opposed control wheels 16. Two of said wheels engage two of the spaced journals 20 on the workpiece, the other two wheels engage the other two spaced journals 21.

The work handling elements consist of a carrier for placing work in the grinding throat and removing it therefrom, an elevator for lifting workpieces either inside or outside the grinding throat, and an index member in a convenient position outside the grinding throat.

The means for transporting workpieces into and out of operative position in the grinding throat consists of a cylinder 30 in which is slidably mounted a piston 31. Said cylinder is mounted on a bracket 32 pivotally supported at 33. Piston rod 34 attached to piston 31 extends beyond the right hand end of cylinder 30 and has depending therefrom a work engaging member 35 having two sets of spaced hooks 36 and 37. Hooks 36 receive an unground workpiece and deposit it in the grinding throat in position to be acted upon by two of said grinding wheels 15. At the right hand end of work engaging member 35 is the other pair of spaced hooks 37 for removing the workpiece from the first grinding position and placing it in the indexing device in which the workpiece is turned to place the other two portions thereon in alignment with the grinding throat. The means for raising and lowering work engaging member 35, either in grinding position or loading position, consists of a hydraulic motor having a cylinder 40, a piston 41 slidably mounted therein and having a piston rod 42 pivotally connected to one end of bracket 32. At the end of a grinding operation, bracket 32 is elevated by piston 41 to lift two workpieces out of the grinding throat. Piston 31 moves them axially to a point where the first one is in line with the indexer turn arm and the second one is in line with the unload arm. Bracket 32 is lowered in this position to place the workpieces on the indexer for ejecting one and for turning the other. The carrier then moves farther to the left to place hooks 36 in position to receive an unground workpiece from the load arm of the indexer. At the same time, hooks 37 are positioned to pick up the half-ground workpiece from the turner. A half-ground workpiece is one having only two of the four surfaces ground. The elevator moves up, the carrier moves in and the elevator moves down to place the workpieces in the grinding throat.

The means for manipulating workpieces before and after a grinding operation consists of three arms 100, 101, and 102 mounted for oscillating movement on a shaft 105. Said shaft is supported in bearings 106 and 107 on a base member 108. At the left end of said shaft is an operating arm 109 having a cam faced end portion 110 to engage and actuate switches 3LS, 9LS, and 10LS mounted on a bracket 115 in operative relation with arm 109.

The means for operating shaft 105 and the arms attached thereto, includes a cylinder 120, the head of which is pivotally attached to a support 121. The left end of said cylinder is bored to receive a piston 122. The right end of said cylinder is bored to receive a smaller piston 123 having a rod 124 pivotally attached to arm 109. Operating fluid is supplied to or exhausted from said cylinder to end ports 130 and 131 and intermediate port 132.

Arms 100, 101, and 102 have spaced fingers at the upper end thereof. The fingers on arms 100 and 101 have (vertical) slots 140 and 140' for receiving a workpiece. Arm 102 also has slots 141, but unlike arms 100 and 101, the slots are open on one side to facilitate the removal of a finished workpiece when the arms are oscillated to the right.

Turn arm 101 differs in construction from the other two. The upper part of said arm rests on a cross member 165 perpendicular to said upper portion as shown in Figure 5. The lower portion of said arm is in the form of a vertical shaft 164 mounted in spaced bearings 160 and 161 in a housing 162. At the lower end of shaft 164 is a flange member 166. The surface of said flange member, which engages housing 162, has angularly spaced recesses 167. A spring pressed ball 168 in the lower end of housing 162 engages said recesses as arm 101 is turned to stop said arm in the desired position. Said housing is mounted in a base member 163 mounted on shaft 105.

On either side of arm 101 are two upright members 170 and 171. To the top of each of these members is attached forwardly extending guard strips 175 and 176 which serve to prevent the removal of the workpiece as the arm is oscillated. On member 171 are two inwardly extending cam members 172 and 173. Cam member 172 is positioned in the path of the cross member 165 and cam member 173 is positioned in the path of the upper portion of said arm 101. As the arm 101 oscillates to the right, cam 173 engages the upper portion causing it to rotate approximately 90°. When the arms swing back to neutral position, the unground portion of the workpiece is in position to be picked up by hooks 37. At the same time, cam 172 engages cross member 165 to reset the upper portion of arm 101 with the slots 140' in position to receive the next workpiece from the hooks 36. Also in the left hand position, arm 100 receives an unground workpiece from the chute 150 in Figure 8. This occurs after the carrier 35 has moved toward the grinding throat with the pieces to be ground.

During the turning operation to position the unground portion of the workpiece for grinding, it is necessary that the workpiece be in a substantially horizontal plane. However, it will frequently be deposited in a vertical position. In order to turn the vertical workpiece to a horizontal position, means is provided consisting of a work engaging member 180 pivotally mounted on a shaft 181 on an inclined support member 182 attached at the lower end thereof to base member 108. At one end of shaft 181 is mounted a depending arm 183. The lower end of said arm is connected to one end of rod 184, the other end of said rod being attached to one end of said work loading means 100. A spring 185 on said rod provides a yielding means for transmitting the movement of the loading means 100 to arm 183 and work engaging member 180.

*Operation*

In the following description of the operation of this invention, the abbreviation LS means limit switch. The abbreviation CR means control relay. The number preceding the abbreviation distinguishes it from other similar devices. The number following the abbreviation identifies the contacts in the relay or limit switch referred to. The abbreviation NC preceding any of the above mentioned abbreviations means normally closed. If the abbreviation NC does not appear before any abbreviations mentioned above, it may be assumed that the contact in question is open.

For the purpose of illustration, the description of the operation begins with the indexer in unload position, that is, to the right. In this position, a finished workpiece has just been discharged by unload arm 102. Turn arm 101 retains a workpiece in which the first two portions have been ground. Load arm 100 has already received an unground workpiece.

Depressing the Start switch energizes 10CR.

10CR4 completes a circuit between L1 and L1A which serves as a supply for all relay coils on the control panel and also provides a holding circuit to 10CR through the Stop switch.

A circuit from L1A through NC–16CR1 (normally closed) energizes 14CR.

14CR1 and 14CR4 close to complete a circuit from L1 to valve solenoid I shifting the valve to the right and directing fluid under pressure through port 130 to the left end of cylinder 120.

In the Out position of carrier 35, cam 38 on said carrier closes LS2 (limit switch) to complete a circuit to 17CR and also through 10CR1 to 18CR.

Thus, 18CR is energized at the same time as 14CR and completes a circuit through 18CR1 and 18CR4 to energize valve solenoid J shifting the valve to the left and connecting the intermediate port 132 in cylinder 120 with exhaust thus permitting piston 122 to move to the right hand position.

At the same time, solenoid J valve directs fluid under pressure through port 131 to the right end of cylinder 120 shifting the indexer piston 123 to the left against piston 122 which serves as a stop and through rod 124, arm 109, and shaft 105 to move load arm 100, turn arm 101, and unload arm 102 to the left from unload position to central position.

In moving to this position from the right or unload position, turn arm 101 indexes 90° and deposits a half-ground workpiece on carrier hooks 37 and the load arm 100 deposits an unground workpiece on carrier hooks 36.

In central position, arm 109 closes 9LS to energize 30CR.

When 10CR is energized, the circuit is completed from L1A through NC–30CR4, NC–16CR3, and NC–25CR3 to energize 12CR. Energizing 30CR opens through NC–30CR4 to deenergize 12CR.

30CR3 completes a circuit from L1A through 17CR5 and 12CRR to release 12CR to normal position. The circuit from L1 is then completed through NC–12CR2 and NC–12CR3 to energize valve solenoid C to shift said valve to the right and direct fluid under pressure to the lower end of elevator cylinder 40.

Elevator piston 41 moves upwarly to lift carrier 35 to remove workpieces from arms 100 and 101. The upward movement of piston 41 closes 8LS to energize 29CR and complete a circuit from L1A through 29CR8 and 17CR1 to energize 27CR. At the beginning of the cycle, with the indexer piston in right hand position, a circuit was completed from L1 through 10LS to energize 31CR. At the same time, 4LS opened the circuit through NC–24CR3 to deenergize 20CR. 20CR3 opened the circuit from NC–17CR4 to deenergize 18CRR.

31CR1 completes a circuit from L1A through NC–16CR4 to energize 13CR.

13CR1 and 13CR2 complete a circuit from L1 to energize valve solenoid E shifting said valve to the left and connecting the left end of carrier cylinder 30 to exhaust.

When arm 109 moves to central position, 10LS is released deenergizing 31CR, opening 31CR1 and deenergizing 13CR.

Thus, 13CR is held by 13CRR until the circuit from L1A through 27CR1 energizes 13CRR permitting 13CR to drop out. Deenergized, 13CR opens the circuit from L1 through 13CR1 and 13CR2 to deenergize valve solenoid E.

27CR3 completes a circuit from L1A and NC–28CR2 through NC–13CR4 to energize 15CR and 16CR.

When 15CR is energized, a circuit is completed from L1 through 15CR1 and 15CR4 to energize valve solenoids F and G. Opening 15CR2 and 15CR3 deenergizes valve solenoid H to permit valve solenoid G to shift the valve to the right. Said valve directs fluid through line 233 to a point in cylinder 30 near the right end of piston 31 when said piston is in Out position.

The purpose of this fluid connection is to prevent the discharge of fluid under pressure through this line when it is uncovered by piston 31 as it moves to the right.

When 16CR is energized, 16CR2 is closed and 16CR1 is open. Opening 16CR1 deenergizes 14CR. Closing 16CR2 completes a circuit from L1A through 22CR3 to energize 14CRR releasing 14CR and opening 14CR1 and 14CR4.

Opening 14CR1 and 14CR4 deenergizes valve solenoid

I. Said valve is shifted to the left to direct fluid under pressure to the right end of cylinder 120 to move piston 123 and the indexer including arms 100, 101 and 102 to the left or load position to pick-up an unground workpiece while the other two pieces are moving into the grinding throat. Movement of piston 123 and index arms to the left, places arm 100 in position to receive an unground workpiece. Arm 109 actuates 3LS to energize 19CR which, in turn, actuates an escapement device (not shown) actuated by valve solenoid K to release an unground workpiece. At the same time, turn arm 101 is turned another 90° for resetting.

When valve solenoid E is deenergized, valve solenoid F shifts the valve to the right providing a full supply of fluid under pressure to the left end of cylinder 30 to shift carrier piston 31 with carrier 35 and two workpieces to the right end or grinding position.

With carrier 35 in grinding position, 5LS is closed, completing a circuit from L1A to energize 23CR and 24CR. 2LS is opened, opening the circuit through 10CR1 to deenergize 18CR which is latched by 18CRR.

23CR4 completes a circuit through NS–25CR3 to energize 12CR.

12CR1 and 12CR4 complete a circuit from L1 to energize valve solenoid D shifting said valve to the left and directing fluid under pressure to the upper end of elevator cylinder 40, moving the elevator and the carrier down to place the workpieces in grinding position.

This movement of the elevator closes 4LS and opens 8LS.

4LS completes a circuit through 24CR2 to energize 22CR.

22CR4 completes a circuit from L1A to energize 14CR.

14CR energizes valve solenoid I shifting said valve to the right and directing fluid under pressure to the left end of cylinder 120 causing the indexer arm 109 and associate work handling arms 100, 101, and 102 to move to the right to the neutral position carrying an unground workpiece on arm 100 and positioning arms 101 and 102 to receive a half-ground workpiece and a completely ground workpiece respectively.

In moving to this position, arm 109 actuates 9LS energizing 30CR.

At the end of a grinding operation, the grinding wheel is retracted and actuates 6LS.

6LS completes a circuit through 26CR3 to energize 25CR.

25CR3 opens deenergizing 12CR, and 25CR1 closes energizing 12CRR which releases previously deenergized 12CR.

NC–12CR2 and 12CR3 energize valve solenoid C shifting the valve to the right and directing fluid under pressure to the lower end of cylinder 40 causing the elevator to rise, lifting the workpiece upwardly from grinding position and closing 8LS and opening 4LS and thus energizing 29CR. The circuits which include 4LS are already open.

29CR8 closes completing a circuit through 22CR1 to energize 28CR.

28CR2 opens deenergizing 15CR and 16CR. 28CR3 closes, energizing 15CR to open a circuit through 27CR3 and NC–13CR4 to deenergize 16CR.

28CR3 completes a circuit to energize 15CRR and thus release the previously deenergized 15CR. 15CR1 and 15CR4 open deenergizing valve solenoids F and G.

NC–15CR2 and 15CR3 energize valve solenoid H.

Deenergizing valve solenoid F results in said valve being centered and blocking exhaust of fluid through line 243F.

Valve solenoid G releases the valve to central position. At the same time, valve solenoid H is energized, as described above, and shifts the valve to the left to direct fluid under pressure to the right end of cylinder 30 shifting piston 31 and carrier 35 to the left.

Exhaust fluid from the left end of the cylinder passes through line 233 until said line is covered by piston 30.

The carrier stops in this position with cam 38 closing 1LS.

1LS completes a circuit through NC–16CR3 and NC–25CR3 to energize 12CR. 12CR1 and 12CR4 energize valve solenoid D. At the same time, opening 12CR2 and 12CR3 deenergizes valve solenoid C so that valve solenoid B may shift said valve to the left and direct fluid under pressure to the upper end of elevator cylinder 40 causing piston 41 and carrier 35 to move downwardly.

Hooks 37 deposit a finished workpiece in unload arm 102 and hooks 36 deposit a half-ground workpiece in turn arm 101.

The downward movement of the carrier and elevator permits the closing of 4LS which completes a circuit through 24CR3 to energize 20CR.

20CR3 closes to complete a circuit from L1A through 17CR4 to energize 18CRR. 18CR was deenergized when the carrier moved to the In position and released 2LS. Also, the opening of 2LS deenergized 17CR. The opening of 18CR is thus delayed until 18CRR is energized in order to actuate the indexer at the proper time.

18CR1 and 18CR4 open, deenergizing valve solenoid J. The valve moves to the left connecting the right end of indexer cylinder 120 with exhaust through port 131. At the same time, fluid under pressure is directed to the intermediate port 132 at the left end of piston 123. Said piston is shifted to the right to move arm 109 in a clockwise direction to discharge the finished workpiece carried by unload arm 102 and to turn the half-ground workpiece 90° in arm 101 to position the unground portion for the next grinding operation.

This movement of the indexer particularly arm 109 closes 10LS energizing 31CR.

31CR1 completes a circuit from L1A through 16CR4 to energize 13CR. 13CR1 and 13CR2 complete a circuit to valve solenoid E shifting said valve to the left end connecting line 243F from cylinder 30 to exhaust. Piston 31, which had previously been stopped due to blocking of the line 243F, is now free to move to the extreme left or carrier Out or load position.

In this position, cam 38 on carrier 35 closes 2LS.

Closing 2LS energizes 17CR direct and 18CR through 10CR1 in preparation for the next grinding cycle.

We claim:

1. In a centerless grinding machine for grinding workpieces having cylindrical surfaces to be ground, the axes of which are angularly spaced, a carrier for shifting workpieces from a point outside the machine to a point above the point of operation and depositing said workpieces in operative position, said carrier having spaced work holding means for accommodating two workpieces, an oscillating device for manipulating workpieces, said device having three work holding members, one of said work holding members being adapted for discharging a finished workpiece, an intermediate member having means to turn the workpiece to place the unground surfaces in position for grinding, the third member serving to receive unground workpieces from a magazine, said oscillating means, when moved to the right, serving to eject one workpiece and turn the half-ground workpiece to place the unground portions in position to be ground and when moving to the left, to receive an unground workpiece and to reset the turning member to position to receive the next half-ground workpiece.

2. In a centerless grinding machine for grinding workpieces having cylindrical surfaces to be ground, the axes of which are angularly spaced, a carrier for shifting workpieces from a point outside the machine to a point above the point of operation and depositing said workpieces in operative position, said carrier having spaced work holding means for accommodating two workpieces, an oscillating device for manipulating workpieces, said device having three work holding members, one of said work holding members being adapted for discharging a finished workpiece, an intermediate member having means to turn the workpiece to place the unground surfaces in position for grinding, the third member serving to receive unground workpieces from a magazine, means to control said carrier in removing workpieces from the machine to deposit a finished workpiece on the ejecting member and a partly finished workpiece on the turning member and thereafter to continue its movement in the same direction to a position to pick up an unground workpiece from the loading member and a partially ground workpiece from the turning member.

3. The combination with a centerless grinder of opposed grinding and regulating wheels and an intermediate work rest forming a grinding throat, means including a transfer device having means for receiving a rough workpiece, means for shifting said transfer device to a position in line with said work rest, reciprocable means for engaging a workpiece and carrying it from said transfer device to said grinding throat, a support for said reciprocable means, and means for tilting same in a vertical plane at one end of its movement to place a workpiece in or remove a workpiece from said grinding throat and at the other end of its movement to deposit a workpiece in said transfer device, a motor for effecting said vertical movement, and means operable at each end of the stroke of said reciprocable means for actuating said motor.

4. The combination with a centerless grinder including opposed grinding and regulating wheels and an intermediate work rest forming a grinding throat and means including a transfer device having means for receiving a rough workpiece and carrying it to a position in alignment with said work rest, a carrier for engaging a workpiece and carrying it between said transfer device and the grinding position, a support for said carrier and means for tilting same in a vertical plane at one end of its movement to place work in or remove work from said grinding throat, said transfer device being in position at the end of a grinding operation to receive a ground workpiece from said carrier and to carry said workpiece to a discharge position, and other means on said transfer device being operable at the same time to turn a workpiece to place another portion of said workpiece in position for grinding.

5. The combination with a centerless grinder including opposed grinding and regulating wheels and an intermediate work rest forming a grinding throat and means including a transfer device having means for receiving a rough workpiece and carrying it to a position in alignment with said work rest, a carrier for engaging a workpiece and carrying it between said transfer device and the grinding position, a support for said carrier and means for tilting same in a vertical plane at one end of its movement to place work in or remove work from said grinding throat, said transfer device having means operable at the end of a grinding operation to receive a ground workpiece from said carrier and to carry said workpiece to a discharge position, and other means on said transfer device being operable at the same time to turn a workpiece to place another portion of said workpiece in position for grinding.

6. The combination with a centerless grinder including opposed grinding and regulating wheels and an intermediate work rest forming a grinding throat and means including a transfer device having means for receiving a rough workpiece and carrying it to a position in alignment with said work rest, reciprocable means for engaging a workpiece and carrying it between said transfer device and the grinding position, a support for said reciprocable means and means for tilting same in a vertical plane at one end of its movement to place work in or remove work from said grinding throat, means for actuating said transfer device at the end of a grinding operation to place one of said work receiving means in position to receive a ground workpiece from said reciprocable means and to carry said workpiece to a discharge position.

7. In a machine for grinding angularly and axially spaced portions of a workpiece, a plurality of grinding wheels axially spaced to correspond to the spacing of the surfaces to be ground, a device for supplying workpieces to said machine, a carrier having spaced pairs of hooks for carrying a pair of workpieces into operative relation with said grinding wheel, means for moving said carrier in a vertical plane, means for handling workpieces outside the grinding position comprising an unloading means, a turning means, and a loading means, means for retracting said carrier after a grinding operation to put the ground workpiece in the unload means and the half-ground workpiece in the turning means, means operable thereafter for moving said arm to the right to eject the ground workpiece and to turn the half-ground workpiece, means for continuing the movement of said carrier to the load position while the transfer apparatus is in unload position, means for shifting the work handling means in one direction to eject the workpiece from the first means, means responsive to said movement to turn the second means to position the unground portion for grinding, means to resume the movement of the carrier during the movement of the work handling means to eject, so that when said handling means returns to the intermediate position, the first pair of hooks on the carrier will engage or receive an unground workpiece from said supply device, and the second pair of hooks will receive a half-ground workpiece from the turning means, means responsive to the return of the transfer means to central position for causing said carrier to carry said workpieces into the grinding machine, means operable to cause the transfer means to move to the left to receive an unground workpiece and to reset said turning means to receive the next half-ground workpiece.

8. In a centerless grinding machnie, a work handling apparatus for workpieces having two pairs of surfaces to be ground on axes at right angles to one another comprising work holding means for handling two of said workpieces at one time, a sliding member for carrying said work holding means from a work receiving position outside the machine to a grinding position in the machine, grinding wheels rotatably mounted in said machine and spaced to provide two grinding stations, one for an unground workpiece, the other for a half-ground workpiece, and means operable upon removal of a pair of workpieces from the grinding position to eject one having all surfaces ground and to index the one having only two surfaces ground to position to have the other surfaces ground.

9. In a centerless grinding machine, a work handling apparatus for workpieces having two pairs of surfaces to be ground on axes at right angles to one another comprising work holding means for handling two of said workpieces at one time, a sliding member for carrying said work holding means from a work receiving position outside the machine to a grinding position in the machine, said machine having two grinding positions for grinding the surfaces on one axis in one position and the surfaces on the other axis in the other position, and means operable upon removal of a pair of workpieces from said grinding positions to eject one having all surfaces ground and to index the one having only two surfaces ground to position to have the other surfaces ground.

No references cited.